(12) United States Patent
O'Keeffe et al.

(10) Patent No.: US 6,801,527 B1
(45) Date of Patent: Oct. 5, 2004

(54) STACKABLE NETWORK UNIT INCLUDING REGISTERS FOR IDENTIFYING STACK MEMBERS AND TRUNK PORTS

(75) Inventors: Daniel M O'Keeffe, Ballyhooly (IE); Kevin Loughran, Castleblayney (IE); Mark A Hughes, Dublin (IE); Paul J Moran, Hemel Hempstead (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/562,131

(22) Filed: May 1, 2000

(30) Foreign Application Priority Data

Feb. 26, 2000 (GB) .............................................. 0004515

(51) Int. Cl.[7] .............................................. H04L 12/56

(52) U.S. Cl. .................................. 370/386; 370/395.32

(58) Field of Search .................................. 370/386, 387, 370/388, 389, 392, 395.1, 395.2, 395.3, 395.31, 395.32, 428, 429

(56) References Cited

U.S. PATENT DOCUMENTS

| | | | | |
|---|---|---|---|---|
| 6,104,969 A | * | 8/2000 | Beeks | 370/218 |
| 6,122,279 A | * | 9/2000 | Milway et al. | 370/395.32 |
| 6,359,879 B1 | * | 3/2002 | Carvey et al. | 370/351 |
| 6,463,479 B1 | * | 10/2002 | Jennings et al. | 709/250 |
| 6,496,502 B1 | * | 12/2002 | Fite et al. | 370/389 |
| 6,535,510 B2 | * | 3/2003 | Kalkunte et al. | 370/389 |

* cited by examiner

*Primary Examiner*—Kwang Bin Yao
(74) *Attorney, Agent, or Firm*—Nixon & Vanderhye P.C.

(57) ABSTRACT

A network switch comprises a multiplicity of ports for receiving and forwarding addressed data packets, a forwarding engine for directing packets received at the ports to at least one other port, a register for storing unit identifications of a set of units including the network unit, and hashing logic for selecting one of the unit identifications in response to address data in a packet. The forwarding engine makes a determination whether the one of the unit identifications corresponds to the network unit and is operative to direct the packet in accordance with that determination. The use of the register enables a substantial increase in the number of ports that can be members of a stack-wide trunk.

7 Claims, 6 Drawing Sheets

STACKABLE NETWORK UNIT INCLUDING REGISTERS FOR IDENTIFYING STACK MEMBERS AND TRUNK PORTS

FIELD OF THE INVENTION

This invention relates to data communication systems for conveying information in the form of addressed data packets, such as Ethernet packets, and more particularly relates to the construction and manner of operation of a stackable unit which may be connected to other similar units and wherein a communication trunk may be connected to ports distributed among the units forming a stack. The main object of the invention is to facilitate an increase in the number of ports which can be members of the trunk connection.

BACKGROUND OF THE INVENTION (a) Stackable Units.

It is well known to provide multi-port network units, such as switches, routers and hubs, which can be 'stacked', that is to say connected so that a multiplicity of such units form effectively a single larger unit composed of modules each constituted by one of the stackable units The term 'stack' arises because frequently, though not necessarily, the units are physically designed so that they may be stacked one above the other. The facility of 'stacking' is very useful in the organisation of networks because it allows for expansion and scaling, though various difficulties are present. Among these is the general inability of a unit in a stack to hold information enabling a determination within that unit of the state or configuration of another stack, A specific example of such a difficulty will be further explained later. Furthermore, certain forwarding rules need to be obeyed to avoid excessive or unnecessary forwarding of packets or duplicates of packets throughout the stack.

(b) Cascades.

In order to enable the forwarding of packets from one unit in a stack to the other units in a stack and vice versa, it is common to provide a connection known as a 'cascade'. This comprises a connection between certain ports, at least one for each unit, so as to provide the physical means by which packets which may be received at one unit in a stack are forwarded prior to ultimate dispatch from the stack. Cascades may be in comparatively simple form, wherein for example cable connections between specified ports, known as 'cascade ports' connect the units in a stack. Alternatively they may be more sophisticated, including ring transmission systems with arbitrated access, such as for example described in GB patent application number 2338155 It is known in, for example, a stackable switch, to provide a 'logical' port which is treated as a destination port by that switch for packets which have to be transmitted via the cascade to another unit. The concept of a logical port is useful when a unit has more than one port connected to the cascade, in such a case a packet which is directed to the 'logical' cascade port is subject to some further logic process in order to determine the physical port from which it should be forwarded onto the cascade.

(c) Trunks.

Another feature in modern network practice is a 'trunk' or 'trunk connection'. Such a connection is useful where the expected traffic from one network unit to another is substantially greater than can be accommodated by a single link. The trunk connection is in essence a set of parallel paths from at least one remote unit to a multiplicity of ports. In its simplest form, the trunk connection is made to a multiplicity of ports on a single unit, so that the total bandwidth available for the trunk is generally the aggregate of the bandwidths available to each of the ports which are 'members' of the trunk connection.

However, with the development of stackable units it is also desirable (and known practice) to make ports of different units within a stack members of the trunk. This presents some difficulties of organisation. More particularly, if (as in the case of a switch) a look-up in a database of the destination of a packet indicates that the packet should be forwarded to a remote device which is connected to the stack by way of a trunk, a further determination is necessary or desirable in order to determine which member port of the trunk should be selected for forwarding the packet on a trunk. Some stackable units are subject to a 'local forwarding' rule governing the switching engines such that if a packet is received by a particular unit and is intended for the trunk then it must be forwarded from a port on that unit which is a member of the trunk. However, such a restriction is not desirable in practice. Additionally, it is generally desirable to provide balancing of the traffic passing through the various members of the trunk and for this purpose it is customary to perform some operation such as hashing on a section of the packet. It may be desirable to perform the hash on a section of the packet that indicates packet flow—e.g. to perform a hash operation on both the MAC destination address and MAC source address. The result of this hash operation will provide a pointer to a register that contains forwarding information for that packet. That forwarding information includes an identification (such as a port number) of each port on that unit which is a member of the trunk. However, as will be seen later, since the unit cannot conveniently hold information concerning which ports on other units are members of the trunk, it is necessary for the storage register or the equivalent which is accessed when a packet is destined for the trunk to identify trunk ports which are not local to the relevant unit as 'cascade' ports, so that the packet will be forwarded by way of the cascade to another unit in the stack. The information in these resisters must be co-related, such that the entries in the units' registers that contains the port numbers of the trunk are consistent across the stack. A location in such a register that in one unit contains a local port of the trunk must contain the cascade port in all the other units in the stack. The need to denote the other trunk ports, that is to say the trunk ports which are not local to a given unit, as cascade ports, severely restricts the number of ports that can be members of the trunk and inhibits scaling of the system.

SUMMARY OF THE INVENTION

The present invention is based on the provision within a stackable unit of a means, such as a register, which may be accessed when a unit determines that a packet should be sent to the trunk, and includes an identification of each of the units which can be selected for forwarding the packet.

The identity returned by this register will determine whether the packet will be forwarded from a local trunk port or needs to be forwarded by way of the cascade to another unit. Such a register can be used in conjunction with a further register identifying specific ports. As will be seen this facility substantially increases the number of ports that can be members of the trunk Further features of the invention will be apparent from the following description and drawings.

DESCRIPTION OF A EXEMPLARY EMBODIMENT

Figure 1:
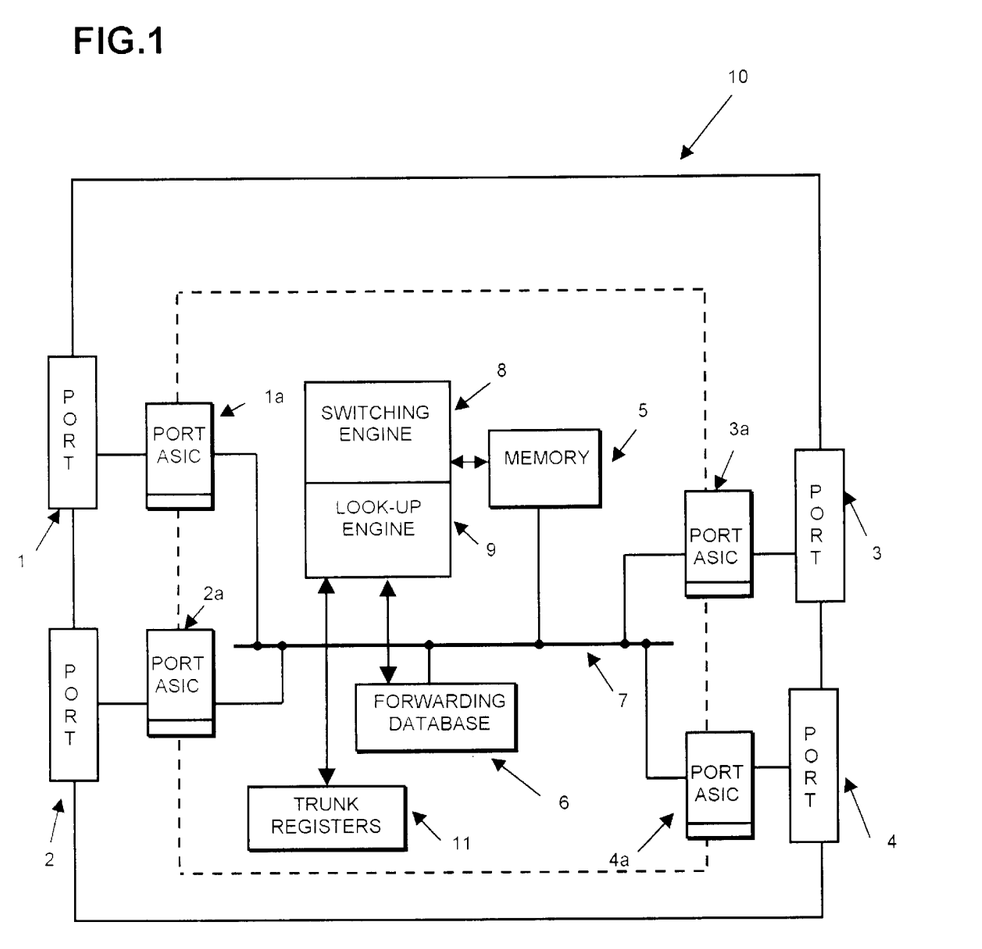
FIG. 1 is an illustration in general schematic form of a switch unit according to the invention.

FIG. 1 illustrates by way of example and in schematic terms a switch 10 which may constitute a stackable unit according to the invention.

Customarily network switches have a substantial multiplicity of ports, typically twenty-eight or more, but in the present example the switch 10 is shown as having four ports 1, 2, 3 and 4. Each of the ports is associated with a port ASIC (1a to 4a respectively) which contain such things as physical layer devices (PHYs) and media access control devices (MACs) relevant to the ports. Although the port ASICs are shown separately in the Figure, they may be disposed on a single chip, and are connected by the dotted line to signify this. Moreover, although the remaining components of the switch shown in FIG. 1 are shown separately, with the possible exception of some or all of the memory employed those components may likewise form part of a single application specific integrated circuit for the switch.

In this example, packets which are received by way of any of the ports may be stored temporarily in memory 5. The switch includes a forwarding database 6 by means of which address data within a packet may be related to data (such as port numbers), which is used by a forwarding engine for the purpose of forwarding packets. The switch has a bus system 7 which is shown in simplified form but is intended to represent buses for not only packet data but also the customary control and status data necessary for the operation of the switch.

The switch includes a switching engine 8 which relies on the forwarding information obtained from the database by a look-up engine 9 to direct packets from the memory to a relevant port or ports of the switch. The switching engine and look-up engine are shown contiguous since they may be principally performed by a software controlled central processor or may be different aspects of a hardware equivalent. Collectively they are termed herein a 'forwarding engine'.

Figure 2:
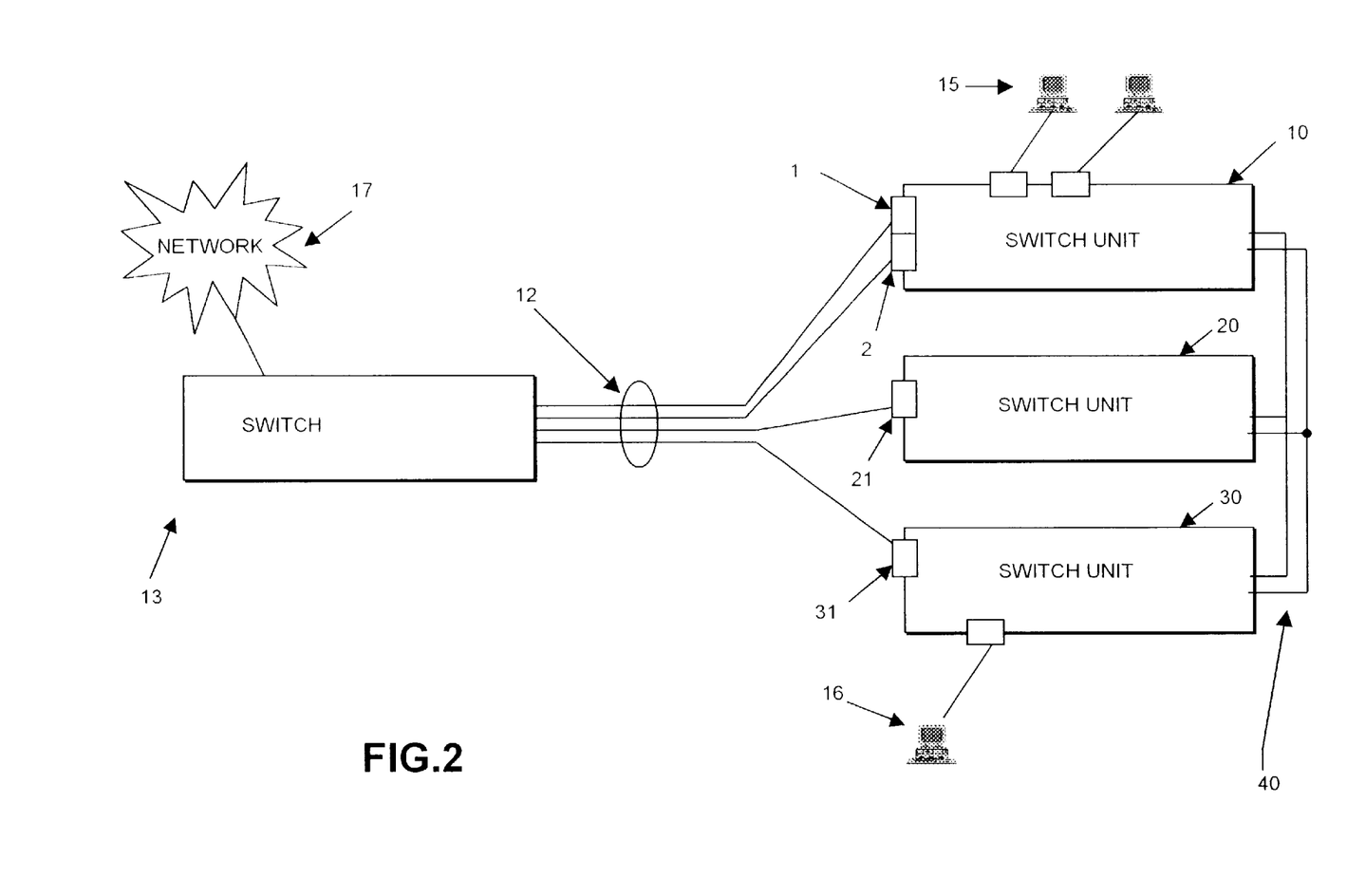
FIG. 2 illustrates a stack of switch units in conjunction with a trunk connection.

As will be explained further in conjunction with FIG. 5 and FIG. 7, the switch includes trunk registers 11. These, as will be explained later, may be accessed in response to look-ups performed by the look-up engine and provide forwarding information to the forwardings engine. FIG. 2 illustrates a stack of switches including the switch 10 and two other switches 20 and 30 connected together by means of a cascade 40 FIG. 2 also includes a trunk connection 12 extending to the stack of units from a switch 13 connected to a network 17. Users 15 are shown as connected to respective ports on switch unit 10 and a user 16 is connected to a port on switch unit 30. The 'far end' of the trunk is here constituted by a single unit 13 but it may be a stack of units.

The trunk 12 is connected to ports 1 and 2 of switch unit 10 and also to port 21 of switch unit 20 and port 31 of switch unit 30.

Such a trunk connection is useful in enabling very heavy traffic to be distributed among various ports An extension of this is to distribute the ports among the units in a stack as shown in FIG. 2 In this case however there exists the general task of determining which ports should be selected for the forwarding of a packet on the trunk towards switch 13. It is possible to employ what is known as a 'local forwarding rule' which requires that a packet be forwarded on a port of the same unit that receives a packet. Thus packets received by switch unit 30 from user 16 and destined for switch 13 would all be forwarded from port 31. However, such a rule is particularly restrictive and the present invention does not employ it.

Figure 3:
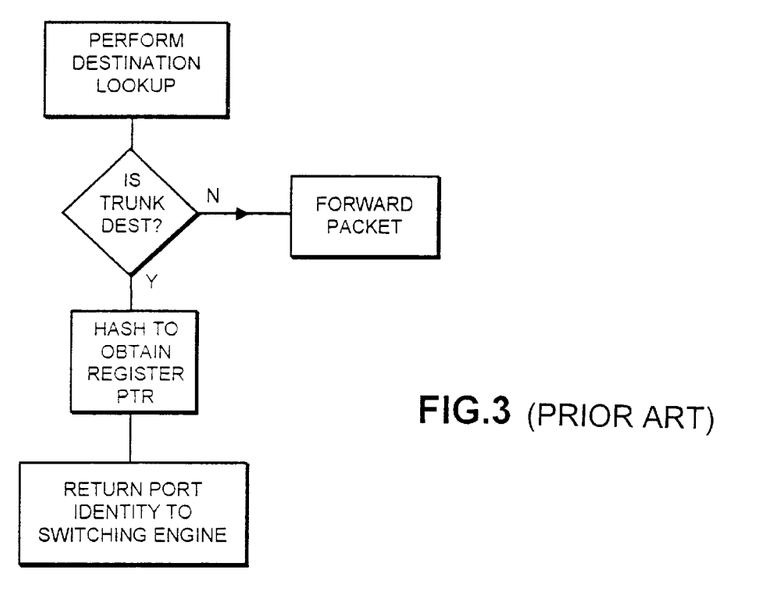
FIG. 3 illustrates a known method of obtaining trunk forwarding information.

FIG. 3 illustrates a known process for obtaining trunk forwarding data.

After a destination look-up has been performed, typically by the look-up engine 9 in forwarding database 6, the forwarding engine can determine whether the destination of the packet is a trunk. It is customary to represent the trunk in a forwarding engine by some form of identification number—either a TrunkID or a PortID. Through the learning mechanism of the switch, packets are 'learnt' against this identification number. This will involve matching the IP address of a device (for layer 3 routers) or matching the MAC address of the device (for layer 2 switches) with the identification number of the trunk.

Figure 4:
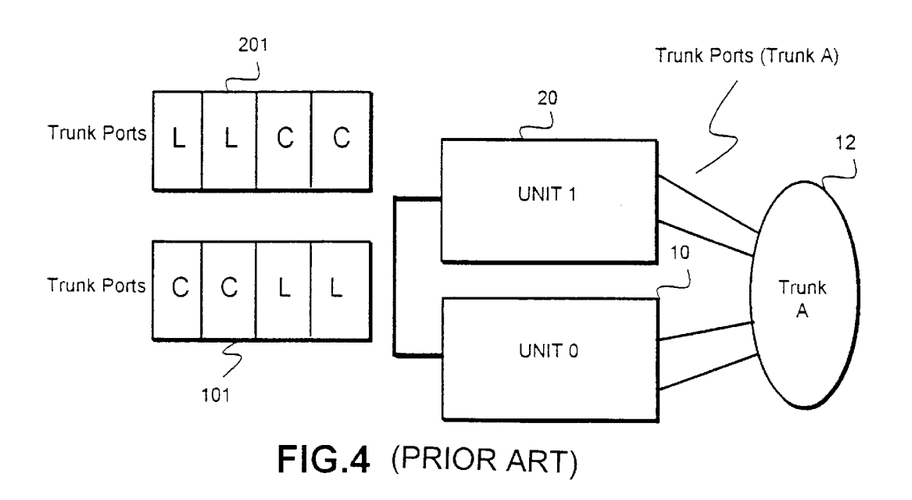
FIG. 4 illustrates a known proposal for trunk port registers.

When a packet is received into the unit and the destination MAC address (destination IP address for layer 3 routing) is found through the look-up engine to be matched against a trunk, then the packet is destined for that trunk. If the destination of the packet is some port other than a trunk, the relevant switch will forward the packet either on one of its local ports or by way of the cascade to another unit. If however the packet is intended for the trunk, it is known to perform a hashing operation on some part of the packet, in order to select one of the trunk ports from which the packet should egress The hashing operation may be performed on a source address or some other part of the packet, provides a pointer into a trunk port register. As shown in FIG. 4, each of the units 10 and 20 forming a two-unit stack, has a four-entry register 101 and 201 respectively. Hashing will provide a pointer to one or other of four locations in the respective trunk port register. As far as the trunk ports which are local to the unit are concerned, the accessing of the register can return the relevant forwarding data, such as the port number. However, Unit 0 (switch 10) has no means of determining which ports of Unit 1 (switch 20) are members of the trunk. Thus register 101 has (in this case) two entries L which identify the ports that are on Unit 0 and are members of the trunk but the two other entries are set up to yield the identity of the cascade port by which the packet needs to be sent to Unit 1. Although on arrival of a packet sent by way of the cascade, Unit 1 can (by performing a hash similar to that performed in Unit 0) determine the port on which the packet should be forwarded on the trunk, the necessity of denoting in a trunk port register non-local trunk ports as cascade ports imposes a substantial restriction on the number of ports that can be employed in a stack-wide trunk as shown in FIG. 2.

Although it would be possible to increase the size of the register, such an expedient is not in itself particularly beneficial. The addition of one port to a trunk would require the register in each to be widened by one location.

Also, load balancing presents problems. To send more traffic to a port, then this port number must appear as the cascade number in the other units more than once—the cascade port is taking up perhaps two locations in each unit—this is not scaleable at all As will become apparent, in the preferred form of the invention the widening of the register in a unit by one location would provide an additional port for each unit in the stack.

The present invention provides greater versatility and in particular enables a substantial increase in the number of ports in the stack that can be members of the trunk by enabling the identification by unit of not only the local ports that are members of the trunk but also the unit from which the packet should be forwarded.

Figure 5:
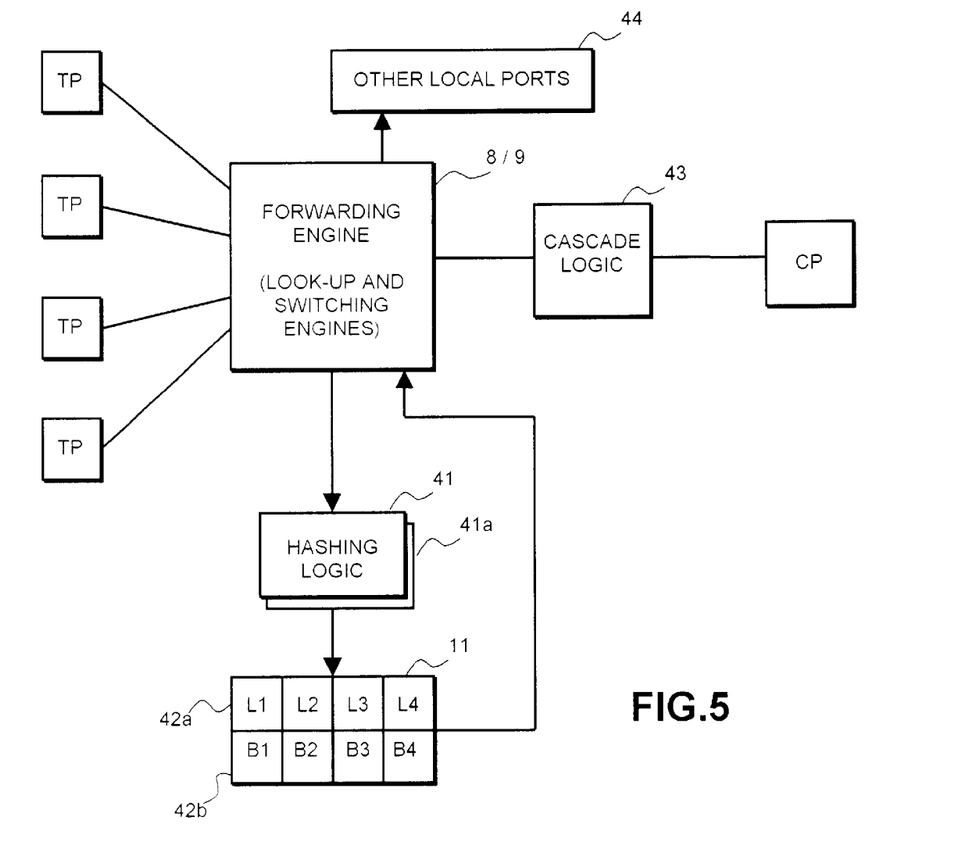
FIG. 5 illustrates an embodiment of the invention in greater detail.

As is shown more particularly in FIG. 5, the registers 11 comprise two registers 49a and 42b. Register 42a can denote those local ports which are members of the trunk. Register 42b has locations identifying the units in the stack It is convenient to call register 42a the local trunk port register and to call register 42b the trunk box register.

Figure 6:
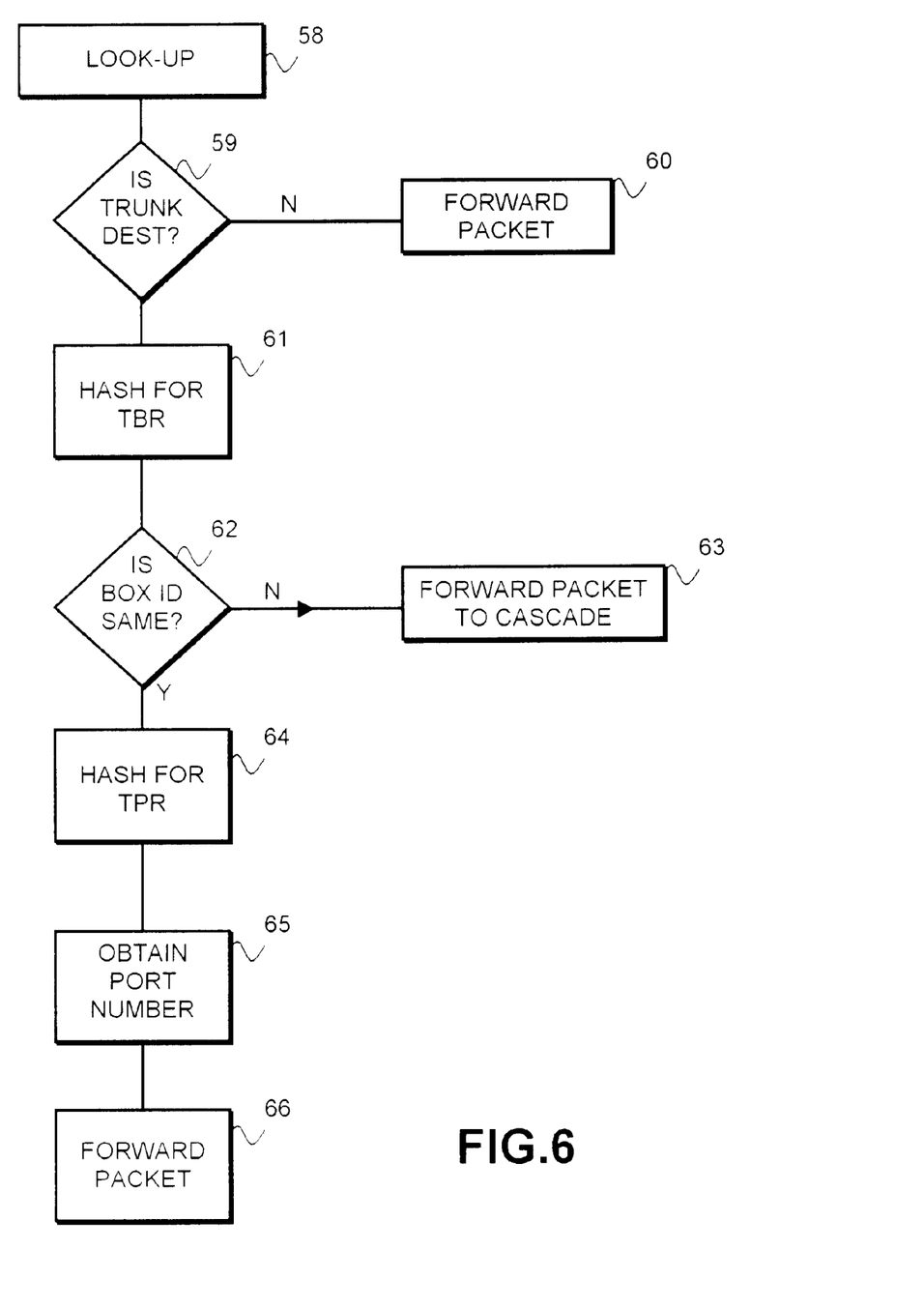
FIG. 6 illustrates a process of obtaining trunk forwarding information according to the invention.

Considering now FIG. 5 in conjunction with FIG. 6, when a packet is received into a unit, e.g. from a port such as those connected to users 15 and 16 in FIG. 2 and a look-up (stage 58) determined (stage 59) that the port is not destined for the trunk, the packet is forwarded normally (stage 60). If the packet is destined for the trunk, the hashing of the relevant address data in the packet provides a pointer to a location in the trunk box register 42 (stage 61), FIG. 6. The entry may be in the form of a 'box Id' (box identification number). This accessed number identifies the box which has the responsibility for forwarding the packet out onto the trunk. The trunk box registers 42b in the units must readily be co-related, so that the same box identification number appears in the corresponding location of the trunk box register in each unit, the same box identification number will be selected for that packet no matter on which unit the packet is received.

If the box identification number is (stage 62) the box identification number of the unit where the packet is located, then it is necessary to select one of the local trunk ports. This may be performed by the execution of another hashing operation by means of hashing logic 41a. The hash for the trunk port register should differ from the hash for the trunk box register because if they were the same, then the only local ports to be used would be those that are stored in the same location as the unit's box Id in the trunk box register. The hashing logic 41 and hashing logic 41a may be performed in part by common hardware but will produce different results, for example the second hash may be performed on a different part of the packet and this hash (stage 64) will obtain the port number from register 42a (stage 65) and the packet may be forwarded on the relevant port (stage 66). In this example there is provision for up to four trunk ports (TP) per unit, if only one trunk port is employed, then the port numbers in register 42a may be all the same so that the second hashing operation will yield the same port number irrespective of the hash result.

If however the box identification number obtained by the first hashing operation (stage 61) is not the same as that of the current unit, then the packet is sent to the unit with the selected box identification number by way of the cascade (stage 63). On reception of that packet the next unit will perform the same steps as the first unit, The process is repeated as necessary until the packet reaches the unit from which it should be forwarded and then that unit will select a local trunk port for forwarding the packet to the trunk. Even if the packet were sent to all units in the stack, as in the case of a broadcast packet, every unit will select the same unit to have responsibility for sending the packet to the trunk. Owing to the 'same port discard' rule the packet will only reach the 'responsible' unit once and accordingly this packet will be sent to the trunk only once.

The 'same port discard' rule is imposed by the IEEE 802.1D standard. It states that when a packet is received in a port, then is may not be forwarded out that port again. In this example, if a unit receives a packet from the cascade, processes the packet through its look-up engine, and discovers that the packet is destined for a port that is not local to this unit, then the unit may not forward the packet back out on the cascade.

The invention may be employed to achieve load management of the traffic in the trunk. For example, one unit may have the fastest ports of the trunk (or the most ports in the trunk) in which case it would be desirable for a greater proportion of the traffic to be sent to it. This may be achieved by placing its box identification unit in the trunk box register more than once. Thus the number of locations in the trunk box register (register 42b) may be more than the number of units and in particular two locations per unit. Then such a unit will be selected for a greater proportion of packets by the hashing process.

Every entry in both the trunk box register and the trunk port register should have a meaningful identification in them, i.e. a box Id and a port Id respectively. However, it is not necessary for every unit in the stack to be represented in the trunk. If a unit is to have no ports in the trunk, its box Id is not entered in the trunk box register.

The invention removes the necessity to put an identification of a cascade port into the trunk port register and this removal in conjunction with the trunk box register enables a substantial increase in the number of ports which may be included as members of the trunk.

Figure 7:
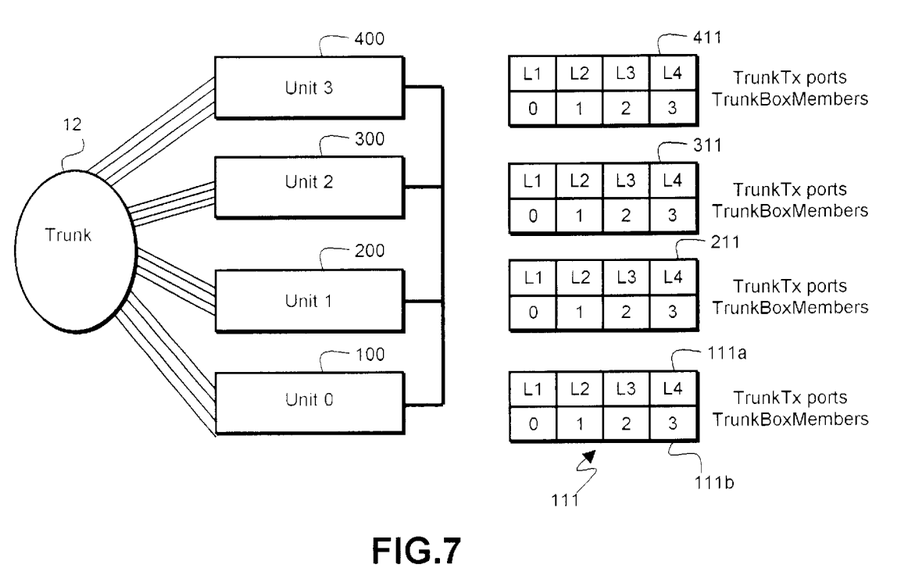
FIG. 7 illustrates stacked units and associated registers in accordance with the invention.

FIG. 7 illustrates four units 100–400 in a stack each having four ports connected to the trunk 12. The units have respective register groups 111–411; each comprises a trunk port register (e.g. register 111a) and a trunk box register (e.g. register 111b).

What is claimed is:

1. A stack composed of a plurality of network units each of which has a multiplicity of ports for receiving and forwarding addressed data packets, wherein:

(a) each network unit includes a forwarding engine for directing a packet received at a port of the unit to at least one other port of the network unit;

(b) a communication trunk is connected to a multiplicity of trunk ports distributed among said network units;

(c) a cascade connects said network units by way of at least one cascade port of each network unit;

(d) each network unit includes a respective first register having at least one storage location for each unit which has at least one of said trunk ports;

(e) each network unit includes a respective second register having at least one storage location for each port that is on that unit and is connected to said communication trunk;

(f) a forwarding engine of a respective network unit makes a determination whether a packet is destined for said trunk and in response thereto accesses a storage location in said respective first register by hashing data within said packet to obtain an identification of one of said network units, said forwarding engine directing the packet to said trunk by way of a trunk port of said respective network unit when said respective network unit has at least one trunk port and said identification corresponds to said respective network unit, and said forwarding engine directing the packet to said cascade when said identification corresponds to a unit other than said respective network unit; and (g) said forwarding engine of a respective network unit accesses said respective second register to determine an egress port for a packet destined for forwarding to said trunk from said respective network unit.

2. A stack as in claim 1 wherein each forwarding engine accesses said respective first register and said respective second register by performing a first hash common to all the network units within the stack on address data within said packet.

3. A stack as in claim 1 wherein said forwarding engine accesses said respective second register by performing a second hash, different from said first hash, on address data within said packet.

4. A stackable network unit for use in a stack of units each of which has a multiplicity of ports for receiving and forwarding addressed data packets and which are connected by a communication cascade and wherein at least some of the units have at least one trunk port for connection to a common communication trunk, the network unit comprising:

(a) a forwarding engine for directing a packet received at a port of the network unit to at least one other port of the network unit;

(b) a trunk box register having at least one storage location for each unit which has at least one trunk port; and (c) a trunk port register having at least one storage location for each trunk port of the network unit;

wherein:

(i) said forwarding engine is organized to make a determination whether a packet is destined for said trunk and in response thereto to perform a hash on data within said packet to access a respective storage location within said trunk box register to obtain an identification of a single one of said units, said forwarding engine directing said packet to said communication trunk by way of a trunk port of the network unit when said respective unit has at least one trunk port and said identification corresponds to said network unit, and said forwarding engine directing said packet to said cascade when said identification corresponds to a unit other than said network unit; and (ii) said forwarding engine, when said packet is destined for the trunk and said respective network unit has at least port in the trunk, accesses said trunk port register to obtain an identification of an egress port for said packet.

5. A stackable network unit as in claim 4 wherein said forwarding engine accesses said trunk port register by hashing respective data within said packet.

6. A stackable network unit as in claim 5 wherein said forwarding engine performs a first hash on address data within said packet to access said trunk box register and a second hash, different from said first hash, on address data within said packet to access said trunk port register.

7. A stackable network unit as in claim 4 wherein said trunk box register contains more than one storage location for at least one of said units whereby different hash results identify the same one of said units.

* * * * *